United States Patent
Kumar et al.

(10) Patent No.: US 11,469,657 B2
(45) Date of Patent: Oct. 11, 2022

(54) APPARATUS FOR MOVING METAL PRODUCTS AND CORRESPONDING MOVEMENT METHOD

(71) Applicant: DANIELI AUTOMATION S.P.A., Buttrio (IT)

(72) Inventors: Pramod Kumar, Kolkata (IN); Andrea Polo, San Giovanni al Natisone (IT); Marco Ometto, Pasian di Prato (IT)

(73) Assignee: DANIELI AUTOMATION S.P.A., Buttrio (IT)

(*) Notice: Subject to any disclaimer, the term of this patent is extended or adjusted under 35 U.S.C. 154(b) by 297 days.

(21) Appl. No.: 16/954,197

(22) PCT Filed: Dec. 14, 2018

(86) PCT No.: PCT/IT2018/050246
§ 371 (c)(1),
(2) Date: Jun. 15, 2020

(87) PCT Pub. No.: WO2019/116411
PCT Pub. Date: Jun. 20, 2019

(65) Prior Publication Data
US 2021/0167677 A1    Jun. 3, 2021

(30) Foreign Application Priority Data

Dec. 15, 2017  (IT) .................. 102017000145185

(51) Int. Cl.
H02K 41/025 (2006.01)

(52) U.S. Cl.
CPC .................. *H02K 41/025* (2013.01)

(58) Field of Classification Search
CPC .................. H02K 41/025; B21C 3/08
See application file for complete search history.

(56) References Cited

U.S. PATENT DOCUMENTS

| 2019/0206565 A1* | 7/2019 | Shelton, IV | A61B 17/0682 |
| 2020/0348662 A1* | 11/2020 | Cella | H04B 17/309 |
| 2021/0157312 A1* | 5/2021 | Celia | H04L 1/18 |
| 2022/0083046 A1* | 3/2022 | Cella | G05B 23/0286 |
| 2022/0083047 A1* | 3/2022 | Cella | H04L 67/566 |
| 2022/0083048 A1* | 3/2022 | Cella | H04L 67/562 |
| 2022/0108262 A1* | 4/2022 | Celia | G06Q 10/063118 |

FOREIGN PATENT DOCUMENTS

| EP | 2 949 407 A1 | 12/2015 |
| JP | S61-164461 A | 7/1986 |
| SU | 970 584 A1 | 10/1982 |

OTHER PUBLICATIONS

International Search Report and Written Opinion for PCT/IT2018/050246, dated Feb. 4, 2019.
International Preliminary Reporton Patentability for PCT/IT2018/050246 dated Jan. 24, 2020.

* cited by examiner

*Primary Examiner* — Pedro J Cuevas
(74) *Attorney, Agent, or Firm* — Marshall, Gerstein & Borun LLP

(57) ABSTRACT

A movement apparatus for a metal product, which includes a first guide device and a second guide device configured to guide the movement of the metal product in a direction of feed. The apparatus includes at least one electro-magnetic inductor located between said first guide device and said second guide device.

10 Claims, 2 Drawing Sheets

APPARATUS FOR MOVING METAL PRODUCTS AND CORRESPONDING MOVEMENT METHOD

FIELD OF THE INVENTION

The present invention concerns an apparatus for moving a metal product made, for example, of steel, copper or suchlike.

In particular, embodiments of the present invention can concern the movement of flat metal products, such as foils, sheet, or suchlike, that is, metal products in which the plane development sizes are much larger than the thickness sizes. In possible embodiments it is not excluded, however, that the movement apparatus can also be used for moving other types of metal products such as bars, rod, plate, or similar and comparable products.

The present invention also concerns a plant for working metal products, which comprises at least the above movement apparatus.

The present invention also concerns a method for moving metal products.

BACKGROUND OF THE INVENTION

Plants for working metal products, for example steel products, are known, which generally comprise a movement apparatus provided to move the metal product along a working line, through one or more operating stations.

In particular, in the field of working metal strip, in the operating station it is possible to perform, by way of example only, one or more of either: surface coating treatments of the strip, cleaning of the strip, for example brushing, processes for applying protective solutions, such as varnishes or anti-corrosion oils.

Movement apparatuses are usually positioned downstream, or upstream, of the one or more operating stations, for example in the terminal segment of the movement line, and exert a drawing action on the strip through the operating stations located upstream, or downstream.

Movement apparatuses generally comprise at least one motorized roller and at least one idle roller located in cooperation with the motorized roller to force the strip to partly wind around the motorized roller.

For example, a solution is known in which the movement apparatus comprises the motorized roller and at least two idle rollers located on the periphery of the motorized roller, one upstream and one downstream respectively, and configured to determine a desired angle of winding and contact of the strip around the motorized roller.

The motorized roller is usually connected to motor members, for example by means of reduction members, such as gears which make the movement apparatus extremely complex and expensive.

The angle of winding of the strip around the motorized roller allows to define a desired contact force which, in turn, generates friction on the motorized roller such as to guarantee a determinate drawing action.

It is also known that the contact force between the motorized roller and the strip can cause surface defects due to sliding or scratching caused by surface irregularities of the motorized roller, or by powders or fragments that come between the motorized roller and the strip.

Consequently, it is particularly important to monitor at least the surface finish of the motorized roller and the degree of cleanliness of the work environment in which the operations are carried out.

These disadvantages are even more pronounced when an acceleration or deceleration of the speed of feed of the strip is required. In these conditions, slippages often occur between the strip and the motorized roller and surface defects occur.

To avoid this disadvantage, it is necessary to suitably control the stresses acting on the strip and the accelerations/decelerations imparted to the motorized roller. This control, however, is particularly complex as the constructional complexity of the movement apparatus increases.

It is also known that the high contact forces that are generated between the strip, the motorized roller, and the one or more idle rollers cause great wear on the rollers and on the mechanical parts associated therewith, such as for example support bearings, of the rolling or sliding type, with a consequent need for frequent maintenance interventions and high maintenance costs.

A known thrust generating set that however presents the above cited drawbacks is cited for example in the document JP S61164461 A.

One purpose of the present invention is to provide a method for moving a metal product that is efficient and effective in drawing.

Another purpose of the present invention is to provide a movement apparatus which guarantees an optimal drawing tension even with metal products of different thicknesses.

Another purpose of the present invention is to provide an apparatus for moving metal products that does not damage the surface thereof.

Another purpose of the present invention is to provide a movement apparatus that is efficient and durable over time, that is, which requires reduced maintenance interventions.

Another purpose is to perfect a method for moving a metal product which has the same performance even with products of different thicknesses.

The Applicant has devised, tested and embodied the present invention to overcome the shortcomings of the state of the art and to obtain these and other purposes and advantages.

SUMMARY OF THE INVENTION

The present invention is set forth and characterized in the independent claims, while the dependent claims describe other characteristics of the invention or variants to the main inventive idea.

In accordance with the above purpose, a movement apparatus for a metal product according to the present invention, comprises a first guide device and a second guide device configured to guide the movement of the metal product in the direction of feed.

In accordance with one aspect of the present invention, the movement apparatus comprises at least one electro-magnetic inductor located between the first guide device and the second guide device and configured to generate in the metal product a drawing force in the direction of feed.

The drawing force generated by the electro-magnetic inductor occurs without a reciprocal contact between the at least one electro-magnetic inductor and the metal product.

This allows to obtain a simple movement apparatus with a high drawing performance for the continuous feed of metal products.

The movement apparatus, according to the invention, does not require moving parts such as gear motors, rollers, whether they are drawing or contrasting rollers, eliminating the costs deriving from frequent maintenance and/or replacements of components. Moreover, the movement apparatus according to the present invention does not require long and complex operations to set/replace operating components whenever it is required to handle metal products having different sizes, for example different thicknesses.

Moreover, given that the drawing action of the metal product takes place without contact with mechanical components, such as drawing rollers, the surface quality of the metal product is not compromised, for example by the presence of any powders or by a non-optimal surface finish of the rollers.

Furthermore, the movement apparatus according to the present invention allows to reduce the overall bulk and the mechanical complexity of the plant.

Moreover, with the movement apparatus according to the present invention it is possible to eliminate the frictional forces between the metal product and the drawing components and the vibrations to which the metal product is subjected, thereby increasing the efficiency of movement.

A further advantageous aspect is that the movement apparatus according to the present invention allows rapid accelerations and decelerations to be performed if there is a need to modify the feed parameters of the metal product along the plant.

BRIEF DESCRIPTION OF THE DRAWINGS

These and other characteristics of the present invention will become apparent from the following description of some embodiments, given as a non-restrictive example with reference to the attached drawings wherein.

To facilitate comprehension, the same reference numbers have been used, where possible, to identify identical common elements in the drawings. It is understood that elements and characteristics of one embodiment can conveniently be incorporated into other embodiments without further clarifications.

DETAILED DESCRIPTION OF SOME EMBODIMENTS

Figure 1:
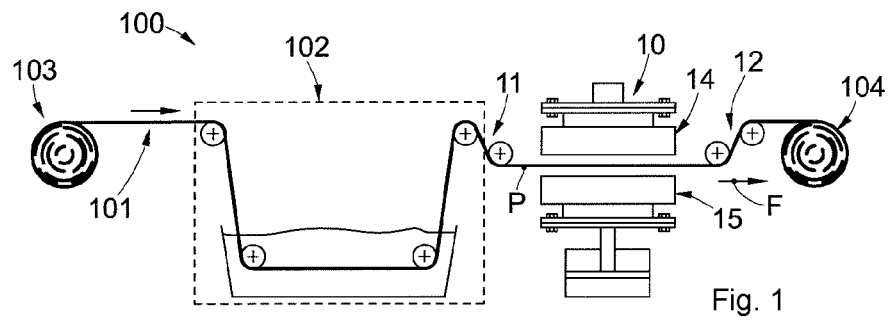
FIG. 1 is a schematic view of an example of a plant for working metal products in accordance with the present invention.

Embodiments of the present invention concern an apparatus 10 for moving electrically conductive metal products P.

The metal products P can be made of steel, copper, or any electrically conductive metal material.

Some embodiments provide that the movement apparatus 10 is configured to move metal strips having, for example, a thickness comprised between 0.15 mm and 12 mm and a width comprised between about 5 mm and about 1600 mm.

In possible variant embodiments, the movement apparatus 10 can be configured to move other types of metal products P, such as bars, round pieces, rod, plate, or similar products.

According to some embodiments, the metal product P can have a magnetic permeability comprised between about $4 \times 10^{-4}$ H/m and about $7 \times 10^{-4}$ H/m.

According to another embodiment, the metal product P can have a resistivity of between about $8 \times 10^{-8}$ Ωm and about $20 \times 10^{-8}$ Ωm.

According to a preferred embodiment, the metal product P is made of steel.

In particular, the movement apparatus 10 comprises a first guide device 11 and a second guide device 12 configured to guide the movement of the metal product P in a direction of feed F.

The second guide device 12 is disposed downstream of the first guide device 11 and aligned thereto in the direction of feed F.

The first guide device 11 and the second guide device 12 are configured to keep the metal product P aligned on a support and movement plane which, by way of example only, can be horizontal.

In accordance with possible embodiments, the first guide device 11 and the second guide device 12 can each comprise at least one guide roller 13, in this case can each comprise a pair of guide rollers 13 having their axes of rotation orthogonal to the direction of feed F and parallel to the lying plane of the metal product P.

The guide rollers 13 can be rotated in an idle manner around their axes of rotation. In this way, the guide rollers 13 do not induce, on the metal product P, any stresses which can in any way damage it, since the guide rollers 13 are made to rotate by contact with the metal product P.

According to one aspect of the present invention, the movement apparatus 10 comprises at least one electro-magnetic inductor, in this case a first electro-magnetic inductor 14 and a second electro-magnetic inductor 15, located between the first guide device 11 and the second guide device 12, in the direction of feed F, and configured to generate in the metal product P a drawing force T parallel to the direction of feed F.

In particular, the at least one electro-magnetic inductor 14, 15 is located, during use, facing the metal product P which is to be moved, and induces the drawing force T on the latter.

Figure 2:
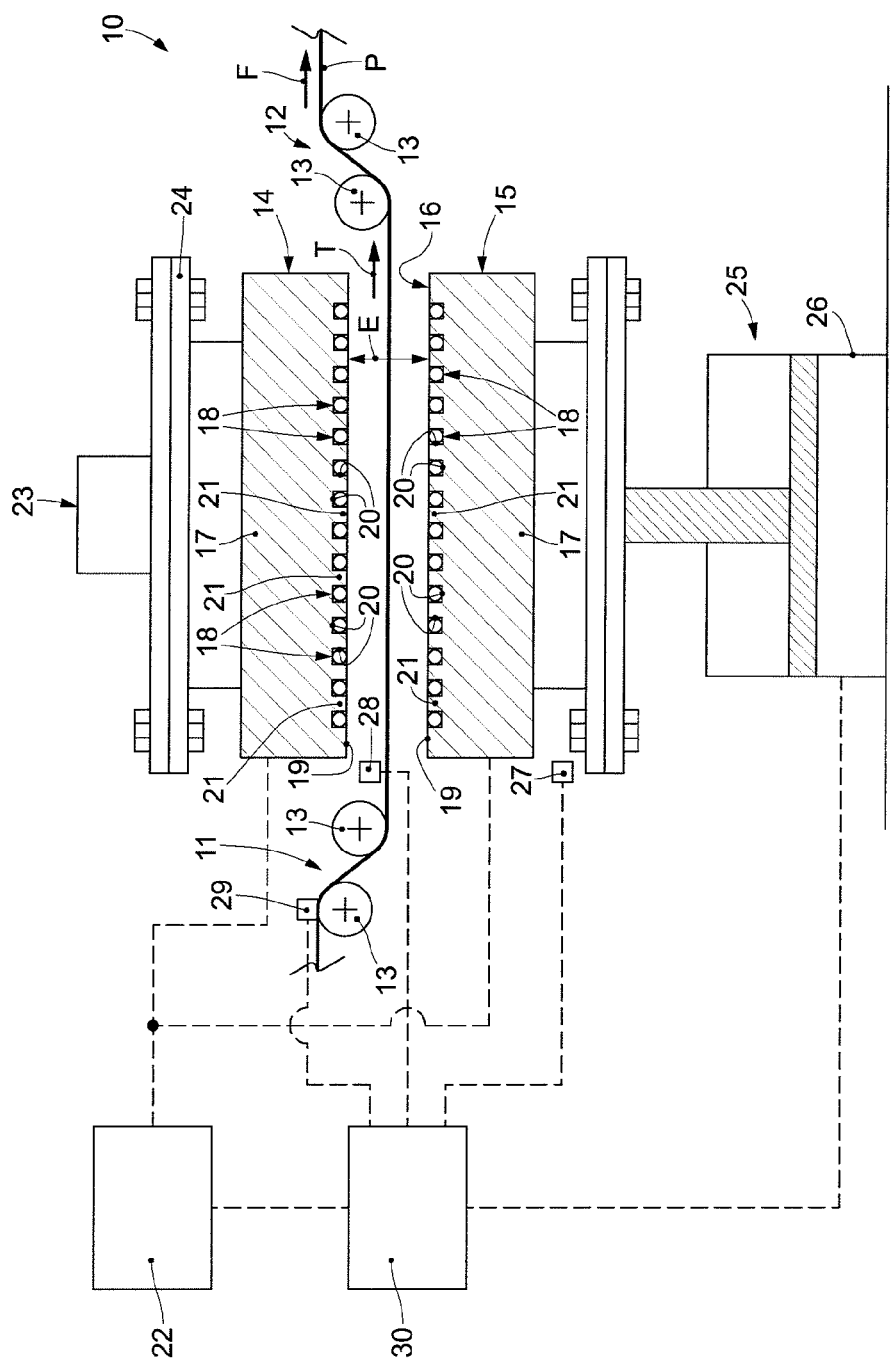
FIG. 2 is a front view of an apparatus for moving metal products in accordance with the present invention.

In accordance with the solution shown in FIG. 2, the first electro-magnetic inductor 14 and the second electro-magnetic inductor 15 are facing each other and define an interspace 16 between them, through which the metal product P is made to pass during use.

This solution allows to generate a contribution of the drawing force T of the metal product P both on the upper surface and also on the lower surface thereof, by means respectively of the first electro-magnetic inductor 14 and the second electro-magnetic inductor 15, such that the components perpendicular to the surfaces of the thrust force reciprocally cancel each other.

According to this embodiment, it is provided that the first electro-magnetic inductor 14 and the second electro-magnetic inductor 15 are substantially identical to each other, generating the same forces on the metal product P that is moved.

In particular, it is provided that the first electro-magnetic inductor 14 and the second electro-magnetic inductor 15 overlap, and are distanced from each other by said interspace 16.

In this way, the first electro-magnetic inductor 14 is located, during use, facing a first surface of the metal product P, while the second electro-magnetic inductor 15 is located, during use, facing a second surface, opposite to the first surface, of the metal product P.

The at least one electro-magnetic inductor, in this case both the electro-magnetic inductors 14 and 15, comprise a magnetic core 17 and a plurality of coils 18 associated with the magnetic core 17 and each selectively powered electrically to generate a desired magnetization in the magnetic core 17.

In accordance with a possible solution of the invention, the magnetic core 17 is provided with at least one induction surface 19 in which the coils 18 are associated/made.

The induction surface 19 faces, during use, toward a surface of the metal product P to be moved.

The induction surface 19 can have a substantially flat development. This makes magnetic inductors particularly suitable for moving flat strip.

According to possible solutions, if the movement apparatus 10 comprises a first electro-magnetic inductor 14 and a second electro-magnetic inductor 15, the induction surfaces 19 of the latter are located substantially parallel to each other and distanced from the interspace 16.

In accordance with other embodiments of the invention, the magnetic core 17 is provided with a plurality of grooves 20 in which the coils 18 are positioned.

The grooves 20 can be made in the induction surface 19 of the magnetic core 17.

According to a possible solution, the grooves 20 can have a rectilinear development in a direction orthogonal to the direction of feed F.

In accordance with this solution, the grooves 20 can extend through and open also in the lateral walls of the magnetic core 17.

Each coil 18 is defined by at least two longitudinal branches which are each disposed in one of the grooves 20 and by connection branches that connect the longitudinal branches between the ends of the grooves 20 to define the coils 18 with an elongated annular shape, in which the length is preponderant with respect to the width.

The connection branches can be located outside the magnetic core 17 and in correspondence with the lateral walls of the latter.

The grooves 20 and the respective coils 18 define between them pole pieces 21 which, in relation to the electric current which is circulated in the coils 18, are magnetically polarized to induce a desired magnetic field on the metal product P.

In accordance with the embodiment in which the movement apparatus 10 comprises the first electro-magnetic inductor 14 and the second electro-magnetic inductor 15, the latter face each other so that the pole pieces 21 of the first electro-magnetic inductor 14 face pole pieces 21 of the second electro-magnetic inductor 15, which have a different polarity from those of the first electro-magnetic inductor 14.

In accordance with possible solutions, the coils 18 have an elongated shape in a direction D parallel to the induction surface 19 and transverse to the direction of feed F of the metal product P. This makes the electro-magnetic inductors 14 and 15 particularly suitable for moving strip, since it is possible to induce a magnetic field on the latter that affects a good part or the whole width of the strip worked.

According to a possible solution, it can be provided that the coils 18 and the corresponding pole pieces 21 have a length, in direction D, which is greater than or equal to the width of the metal product P.

According to a variant embodiment, the coils 18 and the corresponding pole pieces 21 have a length, in direction D, which is smaller than the width of the metal product P moved.

According to possible solutions, the magnetic core 17 can have a magnetic permeability comprised between about $1.5 \times 10^{-3}$ H/m and about $4 \times 10^{-3}$ H/m.

According to another embodiment, the magnetic core 17 can have a resistivity comprised between about $30 \times 10^{-8}$ Ωm and about $50 \times 10^{-8}$ Ωm.

These ranges of values of the magnetic permeability and resistivity of the magnetic core 17 are appropriately selected to optimize the drawing action.

According to a preferred embodiment, the magnetic core 17 can be made of steel for electrical applications, such as steels containing quantities of silicon at least close to or higher than 3%.

According to the present invention, the combination of the metal product P and the at least one electro-magnetic inductor, in this case the first electro-magnetic inductor 14 and the second electro-magnetic inductor 15, substantially defines a linear induction motor, also called LIM, wherein the primary part of the linear motor is defined by the at least one electro-magnetic inductor 14, 15, and the secondary part of the linear motor is defined by the metal product P.

In the embodiment in which the movement apparatus 10 comprises the first electro-magnetic inductor 14 and the second electro-magnetic inductor 15, the latter substantially define two primaries of the linear induction motor.

In accordance with possible solutions of the present invention, the coils 18 are connected to an electric power unit 22 configured to power the coils 18 electrically, with multiphase alternating electric currents, in a suitable manner to generate the forces to feed the metal product P.

Figure 4:
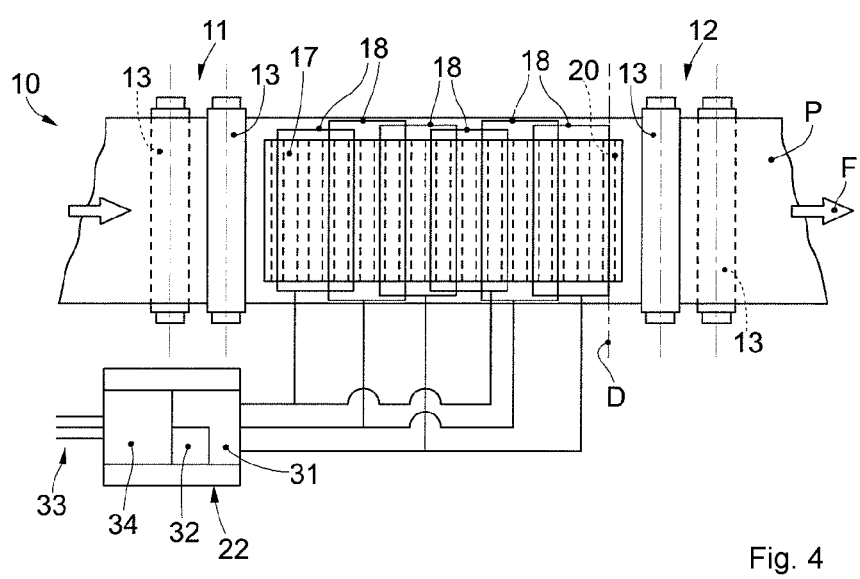
FIG. 4 is a plan view of FIG. 2.

In particular, it can be provided that the electric power unit 22 is configured to provide the coils with an electric power supply with a number of phases greater than or equal to two. In the case shown schematically in FIG. 4, the coils 18 are supplied by a three-phase system, in which the supply currents and/or voltages are reciprocally offset from each other.

In particular, according to the number of supply phases provided by the power unit 22, the at least one magnetic inductor 14, 15 comprises a number of groups of coils 18 which corresponds to the number of supply phases. Each group of coils 18 is electrically connected to a respective supply phase.

By way of example only, and with reference to a three-phase power supply, the electro-magnetic inductor 14 or 15 comprises three groups of coils 18, in which the coils 18 of each group are connected to a respective supply phase of the electric power unit 22.

In particular, the coils 18 are installed in the magnetic core 17 so that, in the direction of feed F, they are disposed in repeated sequence, that is, in the case of a three-phase power supply, a repeated sequence of one coil of the first group, one coil of the second group, and one coil of the third group.

According to the embodiment where the movement apparatus comprises the first electro-magnetic inductor 14 and the second electro-magnetic inductor 15, the coils 18 of one and the other are both connected to the same electric power unit 22.

Each of the groups of coils is suitably powered electrically with sinusoidal currents. Thanks to the fact that the coils powered by each phase are distanced from each other in the direction of feed F and are powered by sinusoidal currents offset from each other, a translating magnetic field is generated with a speed defined by the relation $vs=2*f*t$, where "vs" is the speed of the translating magnetic field, "f" is the supply frequency, and "t" is the polar pitch.

The relative motion which is established between the metal product P and the translating magnetic field generated by the coils 18 generates in the metal product P an electro-motive force which, in turn, always generates induced currents in the metal product P.

The currents induced in the metal product P, in turn, generate another magnetic field, called the induced magnetic field, which interacts with the translating magnetic field generated by the coils 18, following it.

Between the induced magnetic field and the translating magnetic field there is a phase shift, also identified by the term sliding "s", which corresponds to the ratio between the speed of the induced magnetic field and the speed of the translating field generated by the coils 18.

The speed of the induced magnetic field, which substantially corresponds to the speed of movement of the metal product P, can be expressed by the relation $vr=(1-s)*2*f*t$.

The presence of a translating induced magnetic field and of currents induced in the metal product P generates, in turn, a drawing force, that is, the drawing force T, which determines the feed of the metal product P in the direction of feed F.

The drawing force T acting on the metal product P and generated by one of the electro-magnetic inductors 14, or 15, can be expressed by the relation:

$$T=(m*I1^2*R2)/(s*vs*(1/(s*G)^2+1))$$

where "m" is the number of phases, "I1" is the supply current of the coils 18, "R2" is the electrical resistance of the metal product P, "s" is the sliding, "vs" is the speed of the translating magnetic field, "G" is a performance factor typical of linear motors.

It must also be considered that the drawing force T is variable according to the sizes of the interspace 16 between the magnetic inductors 14, 15, to the permeability and magnetic resistivity of the metal product P, to environmental conditions such as the ambient temperature, to the thickness and width of the metal product P.

In accordance with a possible solution of the present invention, if the movement apparatus 10 comprises the first electro-magnetic inductor 14 and the second electro-magnetic inductor 15, the electric power unit 22 is configured to supply the coils 18 with a first substantially constant current to generate a uniform magnetic field. Moreover, to generate the thrust action of the metal product P, the electric power unit 22 is configured to supply a second current to the coils 18, balanced with the magnetic field produced by the first current.

For this purpose, the electric power unit 22 can be provided with a first electric supply device and with a second electric supply device, to provide the first current and the second electric current respectively.

The electric power unit 22 can comprise at least one of either a power supply network, a command pulse generator, a converter, an inverter or a possible combination thereof.

According to a possible solution of the present invention, the electric power unit 22 comprises an inverter 31 configured to regulate the parameters of the power supply of the alternating multiphase electric current that is fed to the coils 18, and in particular to regulate at least the parameters of frequency, intensity and phasing of the electric supply phases of the coils 18. By suitably controlling the electric supply parameters of the coils 18 it is possible to regulate the thrust action to be induced on the metal product P depending on specific needs, required for example by the production process.

In accordance with another possible solution, the electric power unit 22 comprises an alternate electric power supply network 33, for example three-phase, a converter 34 configured to convert the alternating current into a direct electric current, and the inverter 31 configured to convert the direct electric current into multiphase alternating current with predefined parameters of frequency, intensity and phasing of the phases. The number of phases supplied by the inverter 31 corresponds to said number of groups of coils 18 present.

The inverter 31 can in turn be connected to a pulse generator 32 provided to determine the frequency of supply of the electric current to the coils 18. In this way, by controlling the supply frequency it is possible to obtain a control also on the speed of the translating magnetic field "vs" and consequently obtain a regulation of the drawing force T acting on the metal product P.

In accordance with possible solutions, if the movement apparatus 10 comprises a first electro-magnetic inductor 14 and a second electro-magnetic inductor 15, these two can be connected in parallel to the inverter.

In accordance with a possible solution of the present invention, the electric power unit 22 can be connected, in turn, to a control and command unit 30 provided to command the actuation of the electric power unit 22 at least as a function of the methods required to feed the metal product P in the direction of feed F.

The control and command unit 30 can comprise said pulse generator.

According to a possible solution, at least one of either the first electro-magnetic inductor 14 or the second electro-magnetic inductor 15, in this case the first electro-magnetic inductor 14, is installed on a support structure 23. The disposition of the first guide device 11 and of the second the guide device 12 with respect to the support structure 23, in the case shown, allows the first electro-magnetic inductor 14 to be kept distanced from the metal product P by a predetermined distance E which, by way of example only, can be comprised between 1 mm and 20 mm.

Between the support structure 23 and the first electro-magnetic inductor 14 an electrically insulating element 24 can be installed, configured to separate the support structure 23 electrically from the first electro-magnetic inductor 14 and prevent electric/magnetic disturbances on the latter.

According to another aspect of the present invention, the movement apparatus 10 comprises a regulation device 25 configured to regulate the position of the at least one magnetic inductor, in this case the second electro-magnetic inductor 15, in a direction orthogonal to the direction of feed F and to the induction surface 19 of the at least one magnetic inductor.

In this way it is possible to move the electro-magnetic inductor 14, 15 closer to and away from the metal product P, in relation to the thickness of the latter.

According to a possible solution, if two magnetic inductors are provided, it is advantageous to provide that the metal product P is made to pass in correspondence with the center line of the reciprocal distance between the first electro-magnetic inductor 14 and the second electro-magnetic inductor 15. This solution allows to compensate some of the forces induced on the metal product, as is described hereafter in the description.

The reciprocal positioning of the electro-magnetic inductors 14 and 15 and the metal product P can be obtained, for example, by regulating the position of the first guide device 11 and of the second guide device 12, and/or suitably activating the regulation device 25 described above.

According to possible solutions, the regulation device 25 can comprise at least one of either a motor, a linear actuator, a worm screw mechanism, a recirculating ball screw mechanism, a rack mechanism or similar and comparable components.

Figure 3:
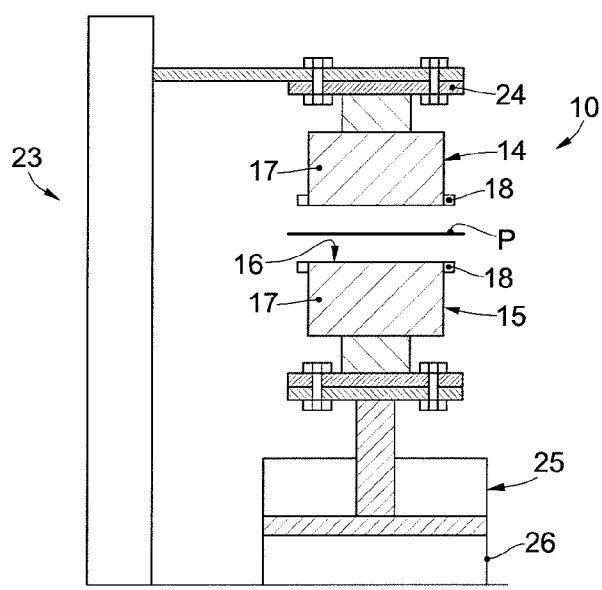
FIG. 3 is a lateral view of FIG. 2.

In accordance with the solution shown in FIGS. 2 and 3, the regulation device 25 comprises a linear actuator 26 attached by one end to a support plane, for example the floor or support structure 23 described above, and by a second end to the at least one electro-magnetic inductor, in this case the second electro-magnetic inductor 15.

In variant embodiments, the first electro-magnetic inductor 14 and the second electro-magnetic inductor 15 each comprises its own regulation device 25.

According to possible solutions, the regulation device 25 can be connected to the control and command unit 30 to command, in an automated way, the movement of the at least one electro-magnetic inductor 14, 15.

In particular, the control and command unit 30, in relation to functioning parameters of the entire apparatus, is able to determine the drive modes of the regulation device 25, to modify the position of the at least one electro-magnetic inductor 14, 15 with respect to the metal product P.

According to a possible solution of the present invention, the movement apparatus 10 can comprise at least one distance sensor 27 configured to detect the distance of the at least one electro-magnetic inductor 14 and 15 with respect to the metal product P which is moved. In relation to this distance it is possible to optimize the electric supply parameters of the coils 18 to optimize the efficiency of movement of the metal product P itself.

According to a possible embodiment it is possible to provide that respective distance sensors 27 are associated with the first electro-magnetic inductor 14 and the second electro-magnetic inductor 15 to detect their reciprocal distance with respect to the metal product P.

According to a possible embodiment, the movement apparatus 10 can comprise a single distance sensor 27 configured to directly detect the reciprocal distance between the first electro-magnetic inductor 14 and the second electro-magnetic inductor 15, that is, the sizes of the interspace 16.

In accordance with some embodiments of the invention, the distance sensor 27 can be connected to the control and command unit 30 to supply the data on the distances and allow, for example, to control and command at least the regulation device 25.

According to other embodiments of the invention, the movement apparatus 10 comprises a movement detector 28 configured to detect the speed of movement of the metal product P in the direction of feed F.

Thanks to the detection of the speed of movement of the metal product P it is possible to carry out corrective actions on the electric supply parameters of the coils 18 in order to optimize their functioning.

The movement detector 28 can in turn be connected to the control and command unit 30 to receive the movement data of the metal product P and implement possible corrective actions for the supply modes of the electro-magnetic inductors 14 and 15.

According to a possible solution, the movement apparatus 10 can also comprise a tension detector 29 configured to detect the tension, that is, the mechanical drawing stress, induced on the metal product P by the drawing force T generated by the at least one electro-magnetic inductor 14, 15.

The tension detector 29 can be associated with at least one of either the first guide device 11 or the second guide device 12. By way of example only, it can be provided that the tension detector 29 is associated with one of the guide rollers 13 and detects the stresses that the metal product induces on the latter. These stresses, in fact, are an index of the tension to which the metal product P is subjected by the action of the at least one electro-magnetic inductor 14, 15.

The tension detector 29 is connected to the control and command unit 30 which, in relation to the tension data of the metal product P, commands the actuation of the first electro-magnetic inductor 14 and the second electro-magnetic inductor 15.

The at least one electro-magnetic inductor 14, 15 generates, in addition to the drawing force T which acts in the direction of feed F, a normal force as well, acting in a direction orthogonal to the movement plane of the metal product P, and a lateral force acting in a direction orthogonal to the direction of feed F and to the normal force.

The normal forces are generated only when the movement apparatus 10 comprises a single electro-magnetic inductor, and tend to move the metal product P closer to or farther from the electro-magnetic inductor. If the movement apparatus 10 comprises two electro-magnetic inductors 14 and 15, and they are equidistant with respect to the metal product P passing through them, the normal force generated in the metal product P by the first electro-magnetic inductor 14 is substantially equal and opposite to that generated by the second electro-magnetic inductor 15, and therefore the normal force resulting on the metal product P is zero.

If the metal product P is closer to the first electro-magnetic inductor 14 than the second electro-magnetic inductor 15, a normal force is generated in the metal product P which will tend to center it in the center line of the interspace 16.

On the other hand, lateral forces are generated if there is an asymmetrical positioning of the electro-magnetic inductors 14 and 15 with respect to the direction of movement of the metal product P, and are created at high frequencies of the electric supply current. In order to prevent these lateral forces, it is also possible to use the lateral containing rollers located on the lateral edges of the metal product P.

In accordance with possible formulations of the present invention, the control and command unit 30 is also configured to monitor and reduce the edge effects, which arise during movement.

The path of the currents induced on the metal product P is not well defined since the latter is mobile with continuous motion.

The paths of the induced currents perpendicular to the direction of movement contribute to generating the drawing action. However, the paths of the induced currents that are parallel to the direction of feed F generate losses and reduce the efficiency of the drawing action.

The more the length of the electro-magnetic inductor is reduced the more these losses are accentuated. The currents induced in the metal product, in correspondence with the edges of the magnetic inductors, are concentrated in the rear part of the latter, generating induced currents unfavorable to the drawing action. This effect is further accentuated by low sliding values.

To reduce these edge effects it is possible to increase the number of pole pieces of the at least one electro-magnetic inductor 14, 15.

The present invention also concerns a working plant 100 which comprises a movement apparatus 10 as described above.

In the working plant 100, the metal product P is moved substantially continuously along a working line 101 by means of the movement device 10 described above.

The plant 100 comprises at least one operating station 102 in which the metal product P is subjected to a predefined operation.

The operating station 102 can be chosen from a group comprising at least one of either a surface treatment station, a cleaning station, a coating station with protective films, a machining station, or a possible combination thereof.

In the case shown in FIG. 1, the operating station 102 is a coating station comprising a tank containing a coating liquid in which the metal product P is made to pass, to be coated on the surface by a protective film.

For example, the protective film can be zinc, chromium, tin, or anti-corrosion protective solutions.

In accordance with the embodiment shown in FIG. 1, the working plant 100 can comprise a supply station 103 and a collection station 104 for the metal product P. Between the supply station 103 and the collection station 104 the movement apparatus 10 as described above can be installed.

Furthermore, the at least one operating station 102 can be installed between the supply station 103 and the collection station 104.

The supply station 103 and the collection station 104 can comprise respectively one or more reels for unwinding and winding the metal product P.

In some embodiments, the movement apparatus 10 according to the invention is installed downstream of the at least one operating station 102.

In possible embodiments, the working plant 100 comprises two or more movement apparatuses 10, for example each of which is located downstream of a respective operating station 102.

Embodiments of the present invention also concern a method for moving a metal product P, which provides to move a metal product in the direction of feed F, guiding it at least between the first guide device 11 and the second guide device 12.

In the metal product P, a drawing force T is generated in the direction of feed F, without contact with the metal product P, by at least one electro-magnetic inductor 14, 15 located between the first guide device 11 and the second guide device 12.

It is clear that modifications and/or additions of parts can be made to the movement apparatus 10, the plant 100 and the method as described heretofore, without departing from the field and scope of the present invention.

It is also clear that, although the present invention has been described with reference to some specific examples, a person of skill in the art shall certainly be able to achieve many other equivalent forms of movement apparatus 10, plant 100 and method, having the characteristics as set forth in the claims and hence all coming within the field of protection defined thereby.

In the following claims, the sole purpose of the references in brackets is to facilitate reading: they must not be considered as restrictive factors with regard to the field of protection claimed in the specific claims.

The invention claimed is:

1. A movement apparatus for a metal product, said apparatus comprising a first guide device, a second guide device configured to guide the movement of said metal product in a direction of feed, and at least one electro-magnetic inductor located between said first guide device and said second guide device and configured to generate in said metal product a drawing force in said direction of feed, wherein said at least one electro-magnetic inductor comprises a magnetic core and a plurality of coils associated with said magnetic core and each able to be selectively powered electrically to generate in said magnetic core a desired magnetization, wherein said coils are connected to an electric power unit configured to power said coils electrically with multiphase alternate electric currents and said electric power unit comprises an inverter configured to regulate the supply parameters of the multiphase alternate electric current to the coils, wherein said magnetic core is provided with at least one induction surface in which said coils are associated, wherein the movement apparatus comprises a regulation device configured to regulate the position of the at least one electro-magnetic inductor, in a direction orthogonal to the direction of feed and to said induction surface of the at least one electro-magnetic inductor and a support structure on which said at least one electro-magnetic inductor is installed, wherein the regulation device comprises a linear actuator attached by one end to the support structure, and by a second end to the at least one electro-magnetic inductor and wherein said regulation device is connected to a control and command unit connected to the electric power unit to command, in an automated way, the movement of the at least one electro-magnetic inductor.

2. The movement apparatus as in claim 1, wherein said magnetic core is provided with a plurality of grooves in which said coils are positioned.

3. The movement apparatus as in claim 2, wherein said grooves have a rectilinear development in a direction orthogonal to said direction of feed.

4. The movement apparatus as in claim 1, wherein said inverter comprises a pulse generator provided to regulate the supply frequency of the electric current to the coils.

5. The movement apparatus as in claim 4, wherein said electric power unit comprises an alternate electric supply network, a converter configured to convert the alternate current into direct electric current, and said inverter configured to convert the direct electric current into multiphase alternate current with predefined frequency parameters, intensity and phasing of the phases.

6. The movement apparatus as in claim 1, comprising a first electro-magnetic inductor and a second electro-magnetic inductor, facing each other and defining between them an interspace through which said metal product is made to pass during use.

7. The movement apparatus as in claim 1, comprising a tension detector configured to detect the tension induced on said metal product by said drawing force generated by the at least one electro-magnetic inductor, said tension detector being associated with at least one of either said first guide device or said second guide device.

8. A plant for working a metal product comprising at least a supply station and a collection station for said metal product, wherein between said supply station and said collection station a movement apparatus as in claim 1 is installed.

9. The plant as in claim 8, wherein, between said supply station and said collection station, at least an operating station is installed, in which said metal product is subjected to a predefined operation.

10. A method to move a metal product which provides to move a metal product in a direction of feed guiding it at least between a first guide device and a second guide device, wherein a drawing force is generated in said metal product, without contact with said metal product, in said direction of feed, by means of at least one electro-magnetic inductor located between the first guide device and the second guide device, wherein said at least one electro-magnetic inductor comprises a magnetic core and a plurality of coils associated with said magnetic core and each able to be selectively powered electrically to generate in said magnetic core a desired magnetization and wherein said coils are connected to an electric power unit configured to power said coils electrically with multiphase alternate electric currents and said electric power unit comprises an inverter configured to regulate the supply parameters of the multiphase alternate electric current to the coils, wherein said magnetic core is provided with at least one induction surface in which said coils are associated, wherein the movement apparatus comprises a regulation device configured to regulate the position of the at least one electro-magnetic inductor, in a direction orthogonal to the direction of feed and to said induction surface of the at least one electro-magnetic inductor and a support structure on which said at least one electro-magnetic inductor is installed, wherein the regulation device comprises a linear actuator attached by one end to the support structure, and by a second end to the at least one electro-magnetic inductor and wherein said regulation device is connected to a control and command unit connected to the electric power unit to command, in an automated way, the movement of the at least one electro-magnetic inductor.

* * * * *